United States Patent
Hernandez Hernandez

(10) Patent No.: US 10,047,409 B2
(45) Date of Patent: Aug. 14, 2018

(54) METHOD FOR PRODUCING NATURAL SKINS

(71) Applicant: SIMPLICITY WORKS EUROPE, S.L., Alicante (ES)

(72) Inventor: Adrian Hernandez Hernandez, Monforte del Cid-Alicante (ES)

(73) Assignee: SIMPLICITY WORKS EUROPE, S.L., Elche-Alicante (ES)

( * ) Notice: Subject to any disclaimer, the term of this patent is extended or adjusted under 35 U.S.C. 154(b) by 352 days.

(21) Appl. No.: 14/916,397

(22) PCT Filed: Sep. 11, 2013

(86) PCT No.: PCT/ES2013/070629
§ 371 (c)(1),
(2) Date: Mar. 3, 2016

(87) PCT Pub. No.: WO2015/036628
PCT Pub. Date: Mar. 19, 2015

(65) Prior Publication Data
US 2016/0215355 A1    Jul. 28, 2016

(51) Int. Cl.
*C14B 1/00* (2006.01)
*C14B 7/02* (2006.01)
*C08L 89/06* (2006.01)
*C14B 7/00* (2006.01)

(52) U.S. Cl.
CPC ............. *C14B 1/00* (2013.01); *C08L 89/06* (2013.01); *C14B 7/00* (2013.01); *C14B 7/02* (2013.01)

(58) Field of Classification Search
CPC .... C14B 1/00; C14B 7/00; C14B 7/02; C08L 89/06
See application file for complete search history.

(56) References Cited

U.S. PATENT DOCUMENTS

| | | | | |
|---|---|---|---|---|
| 2,924,863 | A | * | 2/1960 | Chavannes ............. B23P 15/28 164/104 |
| 3,796,069 | A | | 3/1974 | Statler |
| 4,536,430 | A | | 8/1985 | Krecke |
| 5,958,554 | A | * | 9/1999 | Addie ................... B29C 70/502 264/109 |
| 6,264,879 | B1 | * | 7/2001 | Addie ................... B29C 70/502 264/115 |

FOREIGN PATENT DOCUMENTS

EP    0296297 A2    12/1988

OTHER PUBLICATIONS

International Search Report dated Jun. 4, 2014 for PCT/ES2013/070629.

* cited by examiner

*Primary Examiner* — Shaun R Hurley
*Assistant Examiner* — Andrew W Sutton
(74) *Attorney, Agent, or Firm* — Lucas & Mercanti, LLP

(57) ABSTRACT

The invention relates to a method and the production of natural leathers from pieces of natural leather torn into different-sized fibers which are sorted and placed, once they have been mixed with a binder, in successive layers (6, 7 and 8) on a support sheet (9) provided with filaments crossing the different layers. The support sheet (9) and filaments (10) are extracted once the binder substance has cured.

8 Claims, 2 Drawing Sheets

METHOD FOR PRODUCING NATURAL SKINS

CROSS REFERENCE TO RELATED APPLICATION

This Application is a 371 of PCT/ES2013/070629 filed on Sep. 11, 2013, application which is incorporated herein by reference.

FIELD OF THE INVENTION

The present invention relates to a method for producing natural skins (leathers) made from recycled leather fibers, with absorption, breathability and elasticity characteristics similar to conventional leathers. Said leathers are referred to as natural leathers because in turn they are membranes made from natural fibers, though with the possibility of adding new components that will provide value and improved qualities.

BACKGROUND OF THE INVENTION

There are conventional leathers that go through chrome tanning or vegetable tanning processes for the purpose of stabilizing an organic material and making it inert. Said leathers are from a number of animals, origins and characteristics providing a range of styles. A characteristic of these tanning processes, and particularly chemical tanning, is the large number of environmental pollutants that are used, as well as the high consumption of water, power, etc. This is a sector that has never been among the most highly valued speaking from an environmental point of view.

In turn, there are also consolidated leather fiber agglomerates, which are used for various uses, even for simulating leather but in all cases not resembling typical characteristics of the original leather, i.e., its absorption properties, elasticity properties, breathability properties and appearance.

Finally, the so-called artificial leathers or leatherette, produced by means of implementing a non-woven fabric base on which a plastic sheet layer (polyurethane, PVC, etc.) is applied. Given its low cost, it is a widespread product around the world, being found in many items of clothing, furniture, etc. Said materials have the serious drawback, particularly in clothing such as shoes, of their little breathability and capacity of three-dimensional adaptation to human physiognomy, mentioning shoes as a primary example.

DESCRIPTION OF THE INVENTION

The object of the present invention is a method for producing natural leathers from a process of recycling, defibrating, separating and sorting of leather fibers from scrap leathers in production systems or even from finished products. Waste products are thereby recycled that would otherwise end up in scrap piles, and even in cases of recycling used clothing, this design would handle the closed "cradle to cradle" cycle from the time of production until the product is no longer used in order to be reinserted again into the beginning of the process.

By means of using defibrating technologies, the leather remnants are placed in drums that spin and tear the leathers with metal blades until extracting their minute fibers. Once said small fibers are separated and sorted, they will be arranged in layered sheet fashion configuring a membrane under a philosophy similar to the original leather.

Given their origins and the body parts from which they are extracted, hides have different characteristics, but one they all share is their multi-stratum configuration, these strata basically being referred to as the epidermis, the dermis and the hypodermis. Within each stratum there can be several sub-layers, but they are nevertheless always sheet-like structures with each layer having different functions.

In addition, the layer of animal hides closest to the meat almost generally comprises the sweat glands supporting the fur. Therefore, given that they are located in the inner part, said fur crosses all the layers in order to provide a passage for the sweat generated by animal bodies.

The method of the invention relates to reproducing characteristics that are very similar to the original hides, particularly due to their capacity of sheet-like strata having different qualities, and also due to the arrangement of holes for conveying moisture through all the layers.

Each stratum must be formed from fibers having certain dimensions or characteristics, for example the fibers are smaller towards the outer part of the leather, whereby an almost fiber powder will be used. Said fibers will be mixed together with an adhesive binder compound, preferably from a biofuel, in the attempt to obtain the necessary characteristics for each layer: resistance to abrasion, coefficient of elasticity, water absorption capacity, feel, color, etc. The operation will be repeated with each of the layers attempted to be reproduced with different fiber sizes and different compacting agents.

The method of the invention begins by obtaining natural leather fibers from scrap leathers, an operation that can be carried out in drums provided with means causing the tearing of the pieces of leathers into fibers having different dimensions. Once these fibers are separated, they are sorted based on their dimensions and characteristics. Each class of fibers is mixed with an adhesive binder substance in an inactive state. Then the different classes of fibers, together with the binder material are spread in successive layers on a support sheet that will be provided with an unlimited number of filaments arranged such that they cross the different layers and partially project from the free surface of the outermost layer. Finally, the binder substance is cured and the support sheet is separated from the innermost layer, extracting the fibers from said sheet, whereby there will be an unlimited number of pores crossing all the layers in the body made up of the assembly of layers.

The filaments of the support sheet can be formed, for example, from nylon or polyethylene, as can the sheet itself, and in any case they can be formed from a product that is chemically repellant with respect to the binding agent and fibers that are part of the different layers. Therefore, once all the layers are cured, when the support sheet is separated, the filaments can be easily extracted from said sheet.

Preferably, the support sheet will have through holes for the passage of air or water when arranging the layers of fiber on said sheet.

Leather made from natural leather fibers made up of at least one layer or of layers with different compositions/properties due to the characteristics of the fibers is obtained with the method of the invention. A layer made from fibers having different natures, for example from wool fibers, could also be arranged for the purpose of obtaining greater thermal insulation. For given applications, an intermediate layer with other characteristics could be arranged, even membranes, for example, impermeable membranes having a known constitution, allowing breathing could be incorporated.

The leathers can reproduce appearance characteristics of natural leathers, translated into fur density, curvature of the surface, shape and dimension of the grains of the leather, etc. Said characteristics will be closely related to the design of the leather fiber receiving web which will have a given design of the surface thereof as well as the given fur density and thickness. Additionally and in order to reproduce the characteristics, this base leather can go through processes of conventional dying, application of fats, waxes, brush finishes, fluffing or any process which ultimately improves its final appearance.

Other features that will provide value according to the method of the invention consist of adding elements to the mixture, i.e., flame retarding elements, water and oil repellant elements (stain resistant elements), protection against changing due to UV rays and even conductive properties for making it possible to heat them using electric power. Such additives are ones that can be added in a proportion corresponding to the mixture to obtain a technically superior product designed for specific applications and functions. Many of these additives and compacting adhesive agents can also be eco-friendly, with the subsequent benefit for the environment.

The leather can include one or more layers having impermeable characteristics, made from thermally insulating type materials, having fire-resistant and/or electrically conductive characteristics.

BRIEF DESCRIPTION OF THE DRAWINGS

The different phases of the production process of the invention are depicted in the attached drawings in a schematic manner and by way of non-limiting example, wherein.

DETAILED DESCRIPTION OF AN EMBODIMENT

Figure 1:
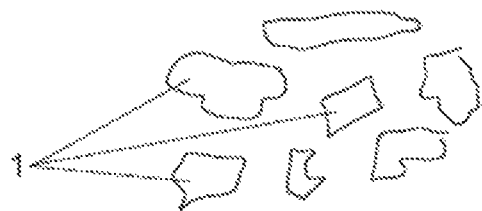
FIG. 1 shows the portions or pieces of leathers on which the method of the invention is based, for the recycling thereof.
Figure 2:
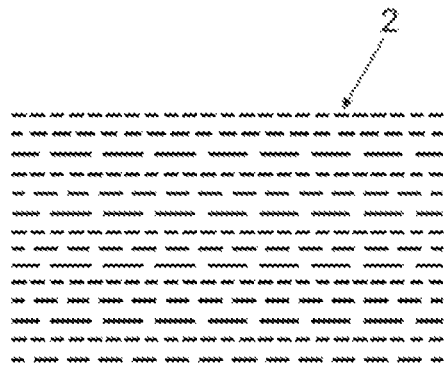
FIG. 2 shows the natural leather fibers obtained from the pieces or portions of leathers of FIG. 1, by means of grinding and tearing thereof.

The method of the invention is a process for recycling of portions (1) of natural leathers coming from different activities. These portions are subjected to a process of defibrating, for example in drums with blades which tear the portions (1) of leathers into minute fibers (2) having different dimensions, as depicted in FIG. 2.

Figure 3:
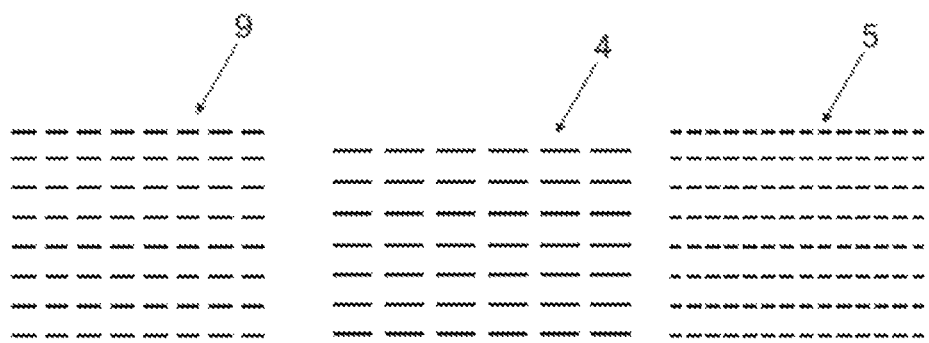
FIG. 3 depicts the sorting of the obtained natural leather fibers, separated by their sizes and characteristics.
Figure 4:
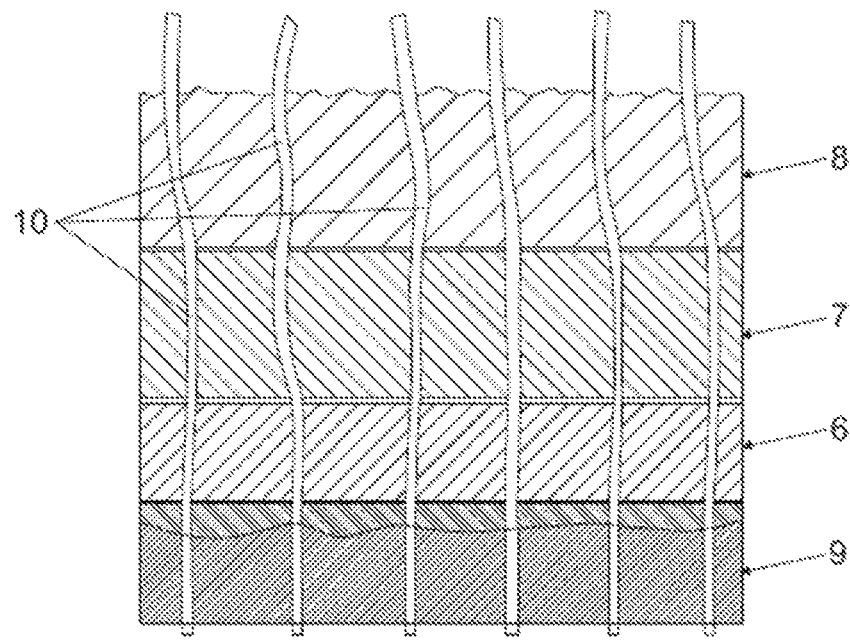
FIG. 4 shows the arrangement of successive layers of different classes of fibers, mixed with a binder, on a support sheet.

Then these fibers are separated, grouping them together according to their dimensions and characteristics to obtain different classes (3, 4 and 5), as depicted in FIG. 3, for example.

Then each class of fibers is mixed with a plastic-type binder substance in an inactive state, for example in powder form.

The different classes of fibers with the binder substance are then spread in successive layers (6, 7 and 8) on a support sheet (9) which has an unlimited number of filaments (10) made from a substance that is chemically repellant with respect to the binding agent and fibers making up each of the layers (6, 7 and 8). Furthermore, these filaments (10) will have sufficient length to cross all the layers arranged on the support sheet (9) and partially project from the free surface of the outermost layer (8).

Figure 5:
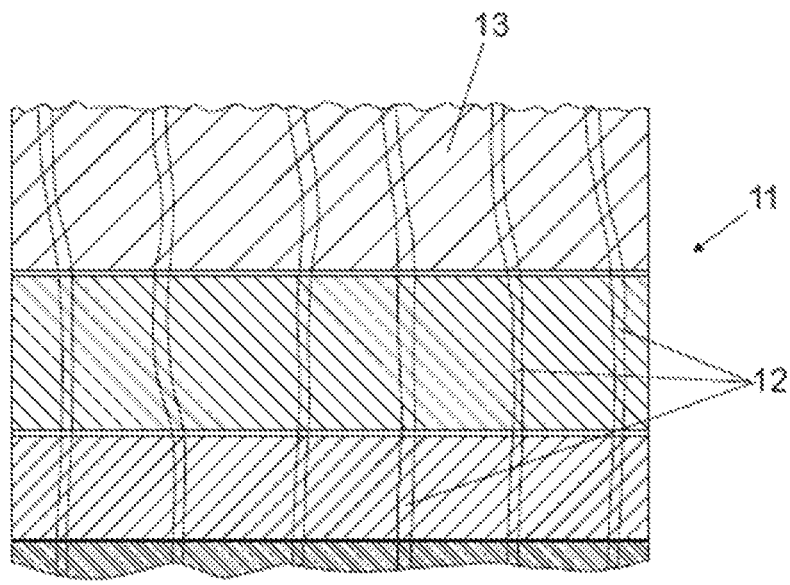
FIG. 5 shows the structure of the leather obtained with the method of the invention, once the support sheet is separated.

Then the assembly made up of the layers is subjected to a process for curing the binder substance, and finally the support sheet is separated and the filaments (10) are extracted, obtaining an assembly (11) depicted in FIG. 5 made up of layers with fibers having different characteristics and provided with an unlimited number of small-sectioned perforations (12) by way of pores which assure breathing between the inner and outer surfaces of the assembly.

It must also be pointed out that the production system of the invention represents a major breakthrough in terms of environmental care, sustainability and personal health, because on one it reduces the amount of waste to be recycled in cases of replacing tanned natural leather, the consumption of water and of tanning pollutants is reduced, and in many cases it allows replacing synthetic leather, with all the health problems that leather of this type causes due to the lack of breathability.

The invention claimed is:

1. A method for producing natural leathers from pieces of natural leather, by means of defibrating pieces of leather into different-sized fibers which are sorted and separated into classes based on their dimensions, the fibers of each class being mixed with a plastic-type binder substance in an inactive state, comprising:
   a) spreading at least one layer with the different classes of fibers together with the binder material on a support sheet provided with an unlimited number of filaments crossing the different layers and partially projecting from the free surface of the outermost layer;
   b) curing the binder substance; and
   c) separating the support sheet of the innermost layer, extracting the filaments from said sheet to obtain small-sectioned perforations crossing all the layers.

2. The method according to claim 1, wherein the different classes of fibers are spread in two or more successive layers, together with the binder material, on the support sheet.

3. The method according to claim 1, wherein the filaments of the support layer are made from a repellant-type material with respect to the type of fibers and binder substance and which cannot be changed by the curing conditions of said binder substance.

4. The method according to claim 1, further comprising placing at least one layer made from impermeable materials.

5. The method according to claim 1, further comprising placing at least one layer made from thermally insulating materials.

6. The method according to claim 1, further comprising placing at least one layer made from fire-resistant materials.

7. The method according to claim 1, wherein at least one of the layers is electrically conductive.

8. The method according to claim 1, wherein the support sheet has through holes located between the filaments of said sheet.

* * * * *